(12) United States Patent
Kim et al.

(10) Patent No.: US 6,388,726 B1
(45) Date of Patent: May 14, 2002

(54) METHOD OF MANUFACTURING LIQUID CRYSTAL DISPLAY DEVICE

(75) Inventors: Hyang Yul Kim; Seung Hee Lee; Seong Ho Hong, all of Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/427,969

(22) Filed: Oct. 27, 1999

(30) Foreign Application Priority Data

Oct. 29, 1998 (KR) .............................. 98-45793

(51) Int. Cl.[7] ............. G02F 1/1345; G02F 1/1333; H01L 21/265
(52) U.S. Cl. ....................... 349/141; 349/43; 438/30
(58) Field of Search ....................... 349/42, 43, 141, 349/138; 438/30, 158, 149, 151, 166

(56) References Cited

U.S. PATENT DOCUMENTS

| | | | |
|---|---|---|---|
| 5,583,671 A | | 12/1996 | Yoshida et al. ............... 349/93 |
| 5,621,556 A | * | 4/1997 | Fulks et al. .................... 349/42 |
| 5,905,552 A | | 5/1999 | Yoshida et al. ............... 349/86 |
| 6,088,072 A | * | 7/2000 | Lee .............................. 349/39 |

FOREIGN PATENT DOCUMENTS

| | | | |
|---|---|---|---|
| EP | EP-0123456 A2 * | 1/2000 | ................. 100/100 |
| JP | 62285464 | 12/1987 | ........... H01L/27/12 |
| JP | 63077150 | 4/1988 | ........... H01L/27/12 |
| JP | 07115202 | 5/1995 | ......... H01L/29/786 |
| JP | 07245403 | 9/1995 | ......... H01L/29/786 |

\* cited by examiner

*Primary Examiner*—Toan Ton
(74) *Attorney, Agent, or Firm*—Ladas & Parry

(57) ABSTRACT

A method of manufacturing a liquid crystal display device driving with fringe field between counter and pixel electrodes, by the following steps. First, by depositing a first transparent conductive layer on a transparent insulating substrate and etching the first transparent conductive layer, thereby forming a counter electrode. Second, by forming a first insulating layer as a protection layer on the substrate formed on the counter electrode. Third, by depositing a first metal layer on the first insulating layer and etching the first metal layer, thereby forming a gate bus line and a common electrode line, the common electrode line being in contact with the counter electrode. Fourth, by forming a gate insulating layer, an amorphous silicon layer and a second insulating layer on the substrate formed on the gate bus line and the common electrode line. Fifth, by etching the second insulating layer to form an etch stopper. Sixth, by forming a doped amorphous silicon layer and a second metal layer on the substrate formed on the etch stopper. Seventh, by etching the second metal layer to form source/drain and a data bus line. Eighth, by etching the doped amorphous silicon layer and the amorphous silicon layer using the source/drain as a mask to form an ohmic layer and a channel layer. Ninth, by forming a passivation layer on the overall substrate formed on the ohmic layer and the channel layer. Tenth, by etching the passivation layer to open a pad portion of the gate bus line, a portion of the data bus line and the source. Finally, by depositing a second transparent conductive layer on the passivation and etching the second transparent conductive layer, thereby forming a pixel electrode, the pixel electrode being in contact with the opened source, the data bus line, and the pad portion of the gate bus line.

18 Claims, 12 Drawing Sheets

METHOD OF MANUFACTURING LIQUID CRYSTAL DISPLAY DEVICE

BACKGROUND OF THE INVENTION

1. Field of the Invention

The present invention is related to a method of manufacturing a liquid crystal device, and more particularly to a method of manufacturing a FFS(fringe field switching) mode-liquid crystal display device driving with fringe field.

2. Description of the Related Art

A FFS mode-liquid crystal display device is suggested for improving aperture ratio and transmittance as illustrated in U.S. Ser. No. 09/087,422. In this FFS mode-liquid crystal display device, counter and pixel electrodes are formed of a transparent conductor. Furthermore, the space between the counter and pixel electrodes is narrow, so that a fringe field is formed therebetween in a presence of electric field, thereby driving all liquid crystal molecules existing on the electrodes.

FIG. 1 is a simplified plan view of a conventional unit pixel and portions of adjacent pixel regions surrounding it in the liquid crystal display.

Referring to FIG. 1, the liquid crystal display includes a plurality of gate bus lines 13 arranged in parallel with each other on substrate in a first direction, and a plurality of data bus lines 19 arranged in parallel with each other on the substrate 10 in a second direction normal to the first direction. The plurality of gate bus lines 13 and the plurality of data bus lines 19 are arranged in a matrix configuration, to thereby define a plurality of pixel regions each bounded by a pair of gate bus lines 13 and a pair of data bus lines 19. The plurality of gate bus lines 13 and the plurality of data bus lines 19 are insulated from each other with gate insulating layer(not shown) intervening between the gate bus lines 13 and the data bus lines 19. A counter electrode 11 is formed as a rectangular frame structure within a respective pixel region and is disposed on a surface of the substrate altogether with the gate bus lines 13.

A pixel electrode 18 is arranged on a surface of the counter electrode 11 with the gate insulating layer(not shown) intervening therebetween.

FIG. 2 to FIG. 4 are cross sectional views for describing a method of manufacturing a FFS mode-liquid crystal display device according to the prior art. Here, FIG. 2 is a cross sectional view taken along the line A–B of FIG. 1, FIG. 3 is a cross sectional view taken along the line C–D of FIG. 1, and FIG. 4 is a cross sectional view of a pad portion.

Referring to FIG. 2 and FIG. 3, a first ITO(indium tin oxide) layer is deposited on a transparent insulating substrate 10 by sputtering using Ar gas and/or $O_2$ gas and etched using a first mask, thereby forming a counter electrode 11 in the shape of comb. An insulating layer 12 as a protection layer is then formed on the substrate formed the counter electrode 11 and a first opaque metal layer is formed thereon by sputtering. Next, the first opaque metal layer is etched using a second mask to form a gate bus line 13 and a common electrode line (not shown). Here, the common electrode line is in contact with the counter electrode 11, as not shown in the drawing.

Thereafter, a gate insulating layer 14, an amorphous silicon layer and a silicon nitride layer are sequentially formed on the substrate formed the gate bus line 13 and the common electrode line. The silicon nitride layer is then etched using a third mask to form an etch stopper 15. Next, a doped amorphous silicon layer is deposited on the etch stopper 15 and the amorphous silicon layer by PECVD (Plasma Enhanced Chemical Vapor Deposition). The doped amorphous silicon layer and the amorphous silicon layer are then etched using a fourth mask to form a channel layer 16 and an ohmic layer 17. A second ITO layer is then deposited on the substrate formed the channel layer 16 and the ohmic layer 17 by sputtering and etched, thereby forming a pixel electrode 18 in the shape of comb between the comb of the counter electrode 11.

As shown in FIG. 4, the gate insulating layer 14 is etched using a sixth mask to open a pad portion 13a of the gate bus line 13. A second opaque metal layer is then deposited on the substrate opened the pad portion 13a of the gate bus line 13 by sputtering and etched using a seventh mask, thereby forming source/drain 19a and 19b and a data bus line 19. At this time, the ohmic layer 17 existing on the etch stopper 15 is removed and the opened pad portion 13a is in contact with the data bus line 19. Thereafter, a passivation layer 20 is deposited on the substrate formed the source/drain 19a and 19b and a data bus line 19. Preferably, the passivation layer 20 is formed of a silicon nitride layer. The passivation layer 20 is then etched so as to expose the data bus line 19.

However, as described above, eight masks are required for manufacturing the liquid crystal display device, so that process is complicated and process time is long. As a result, cost is increases and yield decreases.

SUMMARY OF THE INVENTION

It is therefore an object of the present invention to provide a method of manufacturing a fringe field switching mode-liquid crystal display device which can simplify process by reducing mask number, for solving the problems in the conventional art.

To accomplish this above object, according to the present invention, a method of manufacturing a liquid crystal display device driving with fringe field between counter and pixel electrodes, includes the steps of: depositing a first transparent conductive layer on a transparent insulating substrate and etching the first transparent conductive layer, thereby forming a counter electrode; forming a first insulating layer as a protection layer on the substrate formed the counter electrode; depositing a first metal layer on the first insulating layer and etching the first metal layer, thereby forming a gate bus line and a common electrode line, the common electrode line being in contact with the counter electrode; forming a gate insulating layer, an amorphous silicon layer and a second insulating layer on the substrate formed the gate bus line and the common electrode line; etching the second insulating layer to form an etch stopper; forming a doped amorphous silicon layer and a second metal layer on the substrate formed the etch stopper; etching the second metal layer to form source/drain and a data bus line; etching the doped amorphous silicon layer and the amorphous silicon layer using the source/drain as a mask to form an ohmic layer and a channel layer; forming a passivation layer on the substrate formed the ohmic layer and the channel layer; etching the passivation layer to open a pad portion of the gate bus line, a portion of the data bus line and the source; and depositing a second transparent conductive layer on the passivation and etching the second transparent conductive layer, thereby forming a pixel electrode, the pixel electrode being in contact with the opened source, the data bus line, and the pad portion of the gate bus line.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 2 to FIG. 4 are cross sectional views for describing a method of manufacturing a FFS mode-liquid crystal display device according to the prior art, wherein FIG. 2 is a cross sectional view taken along the line A–B of FIG. 1, FIG. 3 is a cross sectional view taken along the line C–D of FIG. 1, and FIG. 4 is a cross sectional view of a pad portion.

FIGS. 5A to 5G, FIGS. 6A to 6D, FIG. 7, and FIGS. 8A to 8D are cross sectional views and a simplified plan view for describing a method of manufacturing a FFS mode-liquid crystal display device according to an embodiment of the present invention, wherein FIG. 5A to 5G are cross sectional views taken along the line A–B of FIG. 1, FIGS. 6A to 6D are cross sectional views taken along the line C–D of FIG. 1, FIG. 7 is a simplified plan view of a pad portion, and FIGS. 8A to 8D are cross sectional views taken along the line E–F of FIG. 7.

DETAILED DESCRIPTION OF THE INVENTION

Hereinafter, a preferred embodiment of the present invention will be explained with reference to accompanying drawings.

Figure 1:
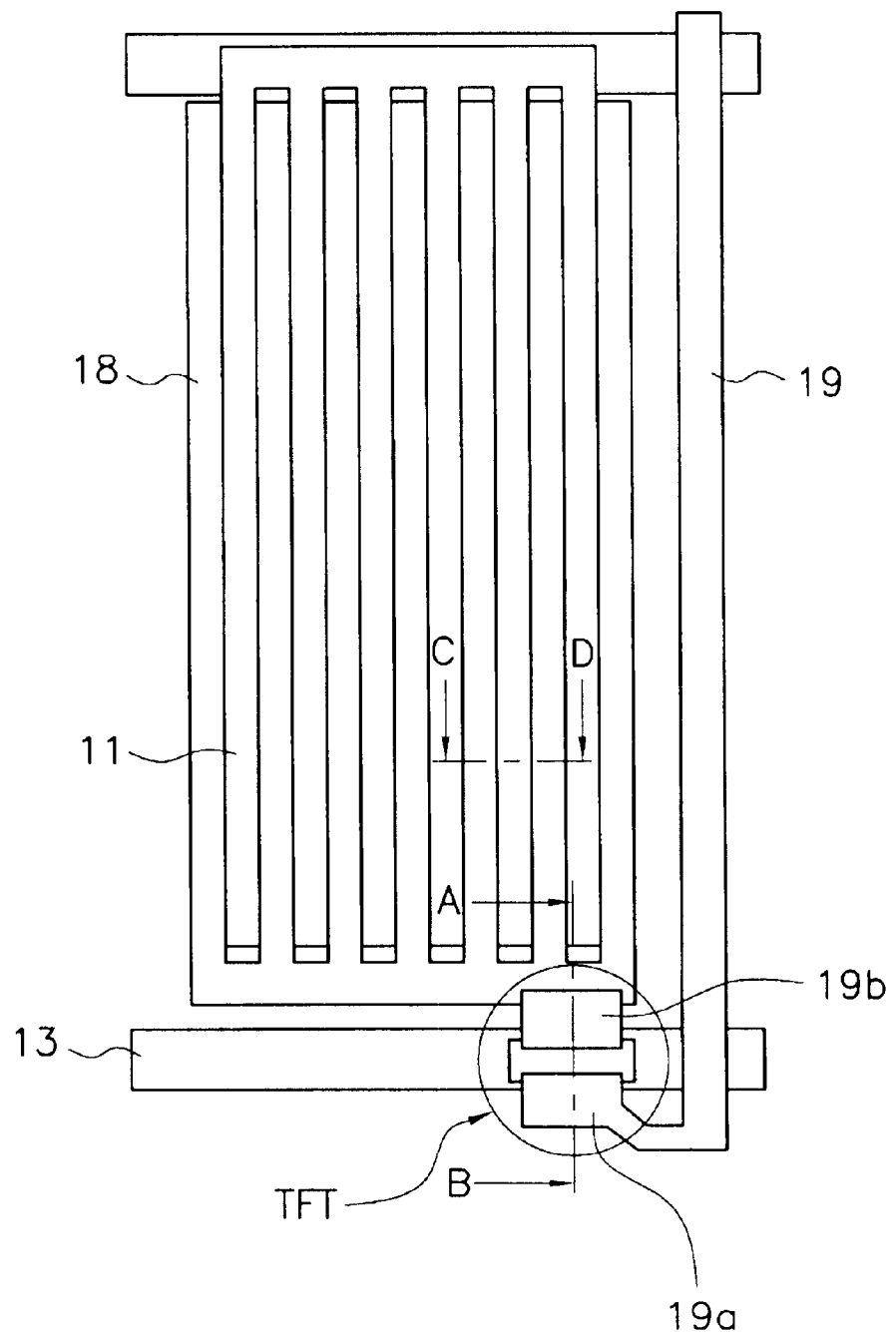
FIG. 1 is a simplified plan view of a conventional unit pixel and portions of adjacent pixel regions surrounding it in the liquid crystal display.
Figure 2:
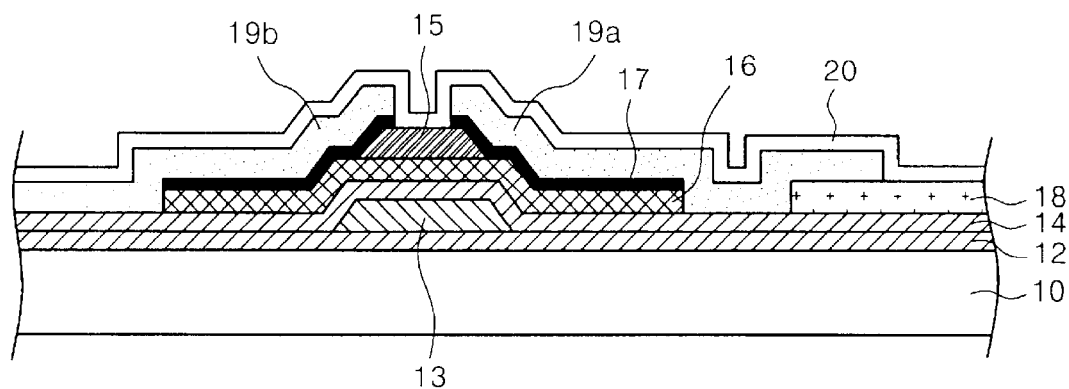
Figure 3:
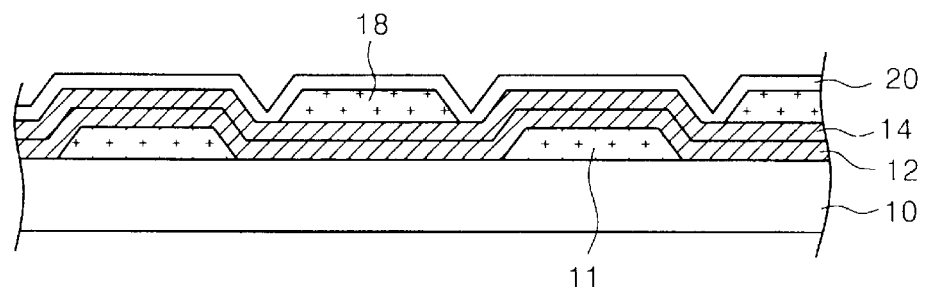
Figure 4:
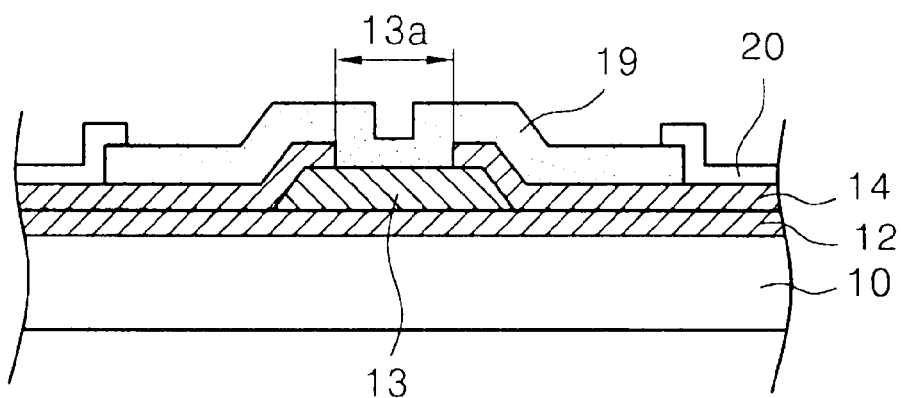
Figure 5A:
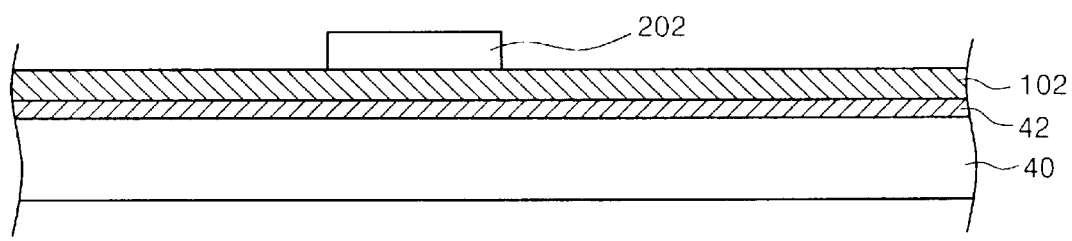
Figure 5B:
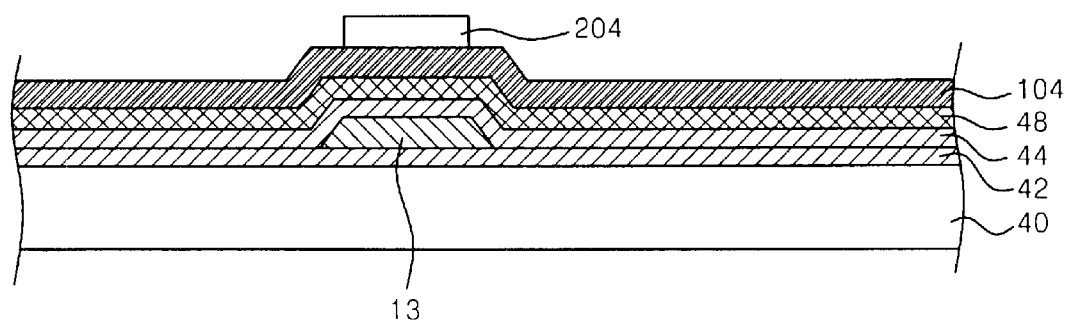
Figure 5C:
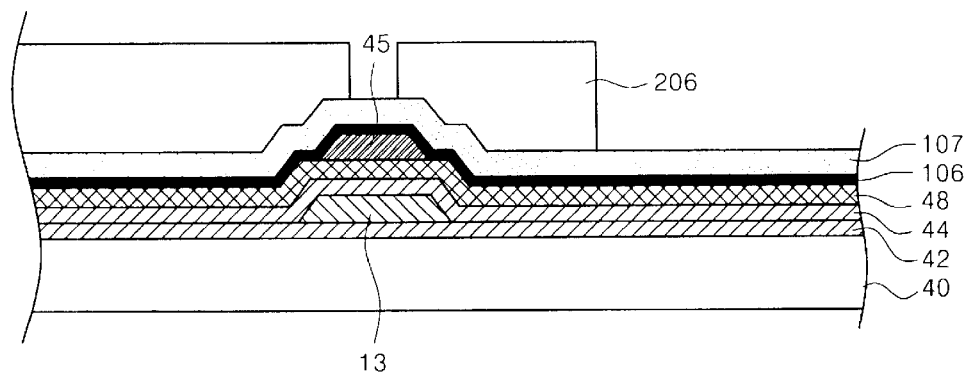
Figure 5D:
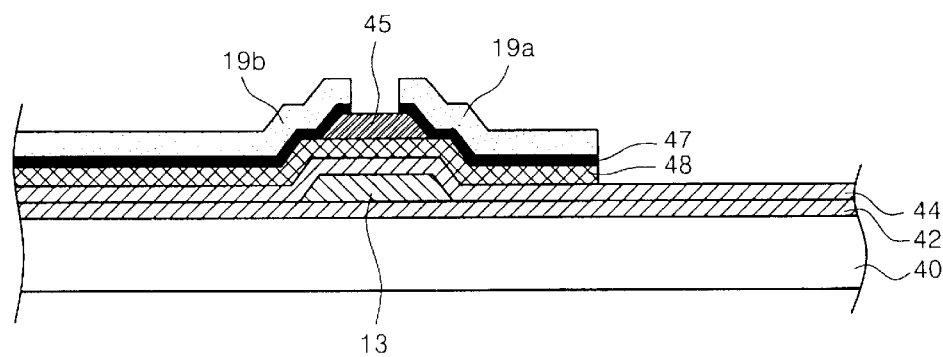
Figure 5E:
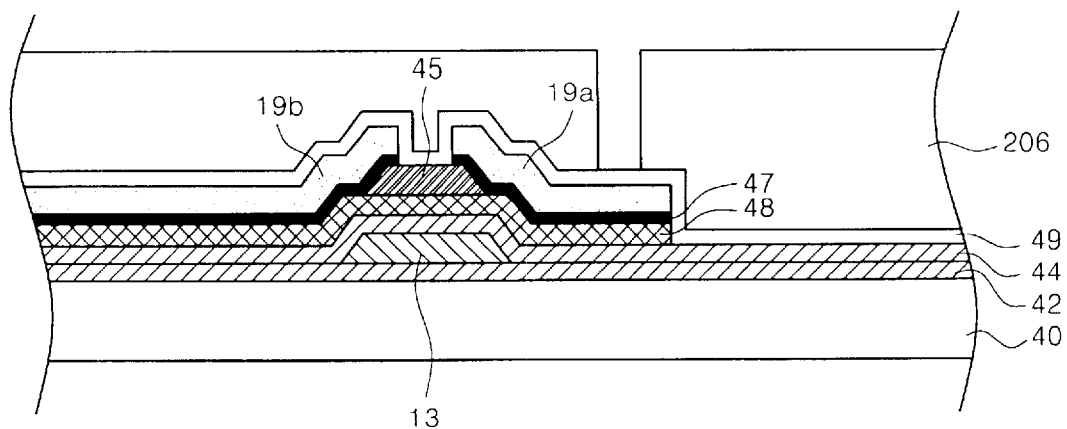
Figure 5F:
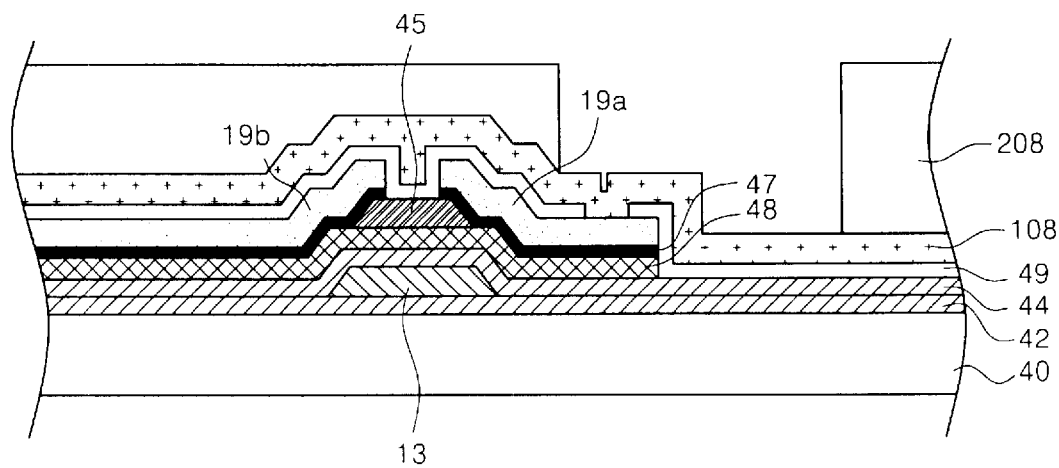
Figure 5G:
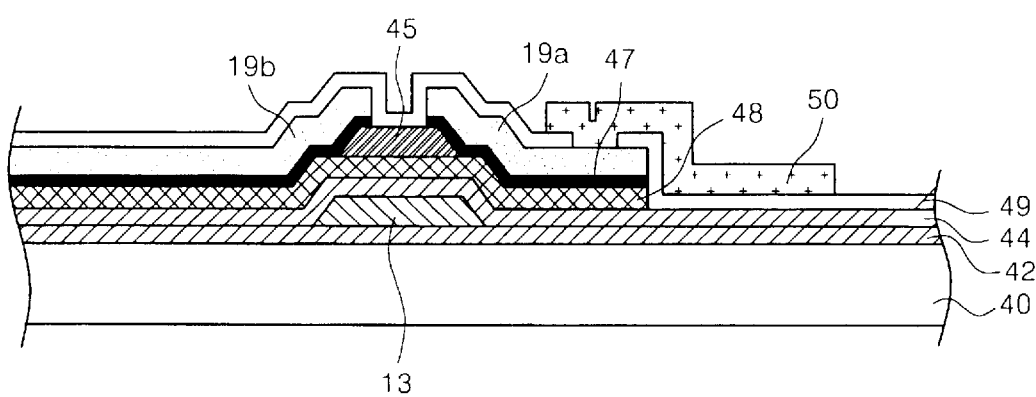
Figure 6A:
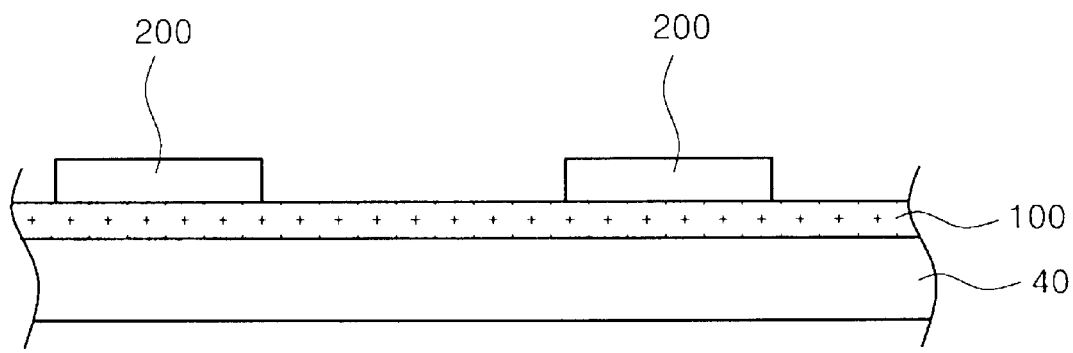
Figure 6B:
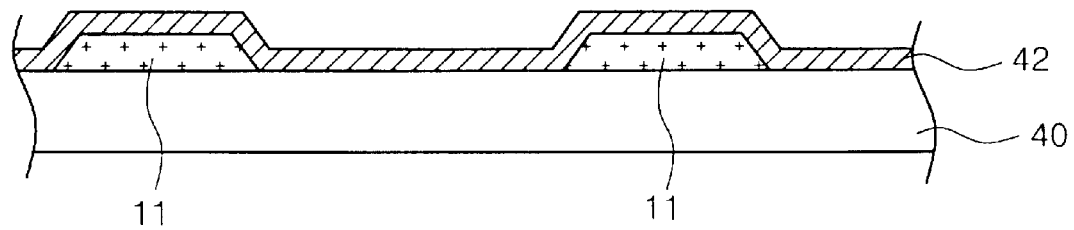
Figure 6C:
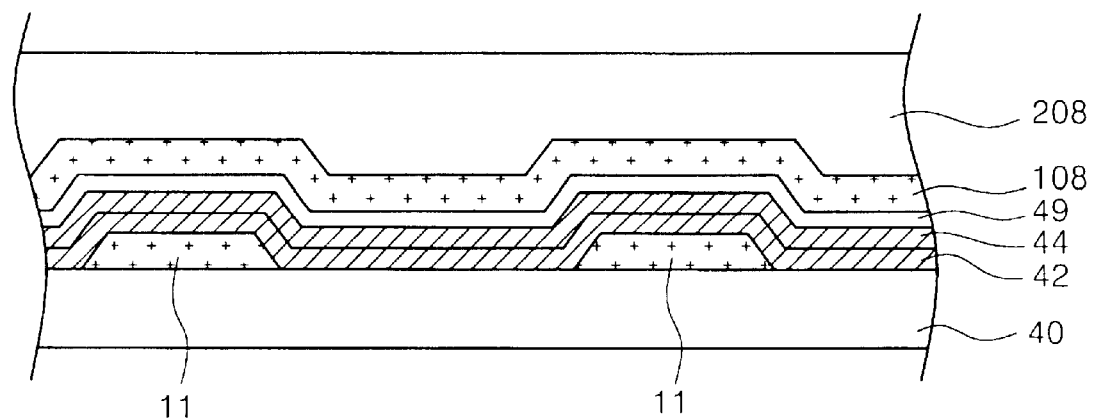
Figure 6D:
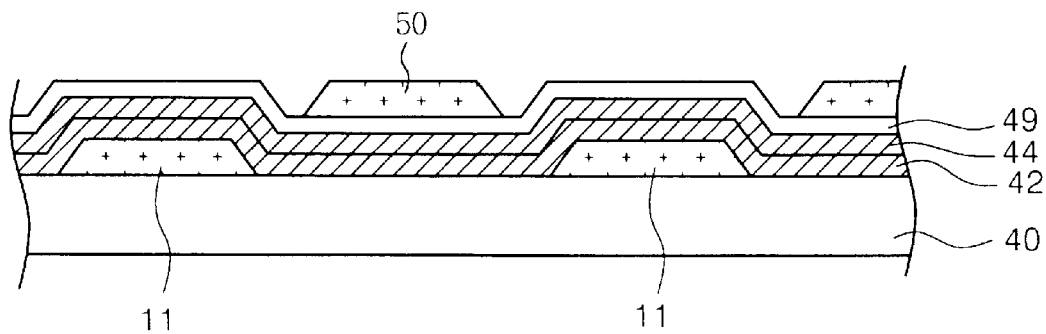
Figure 7:
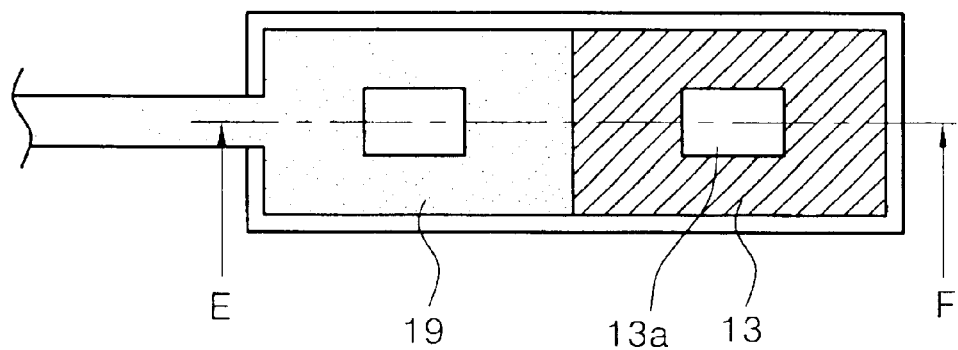

FIGS. 5A to 5G, FIGS. 6A to 6D, FIG. 7, and FIGS. 8A to 8D are cross sectional views and a simplified plan view for describing a method of manufacturing a FFS mode-liquid crystal display device according to an embodiment of the present invention, wherein FIG. 5A to 5G are cross sectional views taken along the line A–B of FIG. 1, FIGS. 6A to 6D are cross sectional views taken along the line C–D of FIG. 1, FIG. 7 is a simplified plan view of a pad portion, and FIGS. 8A to 8D are cross sectional views taken along the line E–F of FIG. 7.

Referring to FIG. 6A and FIG. 6B, a fist ITO layer(100)is deposited on a transparent insulating substrate 40 by sputtering using $O_2$ gas and etched by etching Using a first mask(200), thereby forming a counter electrode 11 in the shape of comb. And then the first mask is removed.

Here, the etching is performed by wet etching using chemical including HCl, $HNO_3$ and $H_2O$. Next, an insulating layer 42 as a protection layer is formed on the substrate formed the counter electrode 11. Preferably, the insulating layer 42 is formed of a silicon nitride layer by APCVD (atmosphere pressure CVD) using $SiH_4$, $O_2$ and $N_2$ gases. Thereafter, referring to FIG. 5A and FIG. 5B, a first opaque metal layer (102) is deposited on the substrate formed the insulating layer 42 by sputtering and etched by etching using a second mask (202), thereby forming a gate bus line 13 and a common electrode line(not shown) which is in contact with the counter electrode 11. And then the second mask is removed.

Here, the first opaque metal layer(102) is formed of a MoW layer, an Al-Nd alloy layer or a Mo/Al layer. For example, in case of using the Al-Nd alloy layer or the Mo/Al layer, the etching is performed by wet etching using etchant including $H_3PO_4$, $CH_3COOH$, $HNO_3$ and $H_2O$. In case of using the MoW layer, the etching is performed by dry etching using $SF_6$, $CF_4$ and/or $O_2$.

Next, a gate insulating layer 44, an amorphous silicon layer 48 and a silicon nitride layer 104 are sequentially formed on the substrate formed the gate bus line 13 and the common electrode line(not shown). The silicon nitride layer 104 is then etched by etching using a third mask 204 to form an etch stopper 45. And then the third mask is removed.

Here, the etching is performed by wet etching using etchant including HF solution of 0.6% and deionized solution.

Referring to FIG. 5C and FIG. 5D, a doped amorphous silicon(N a-Si) layer 106 is then deposited on the etch stopper 45 and the amorphous silicon layer 48 by PECVD using $SiH_4$, $PH_3/H_2$, $N_2$ and $NF_3$ gases. A second opaque metal layer 107 is then formed by sputtering using Kr or Ar gas. Preferably, the second opaque metal layer 107 is formed of a Mo/Al/Mo layer or a MoW layer except for metal layer containing Al, for preventing affection due to Al when forming a pixel electrode subsequently.

Therefore, the second opaque metal layer 107 is etched by etching using a fourth mask 206 to form source/drain 19a and 19b, and a data bus line 19 (refer to FIG. 6B). And then the fourth mask is removed.

For example, in case of using the Mo/Al/Mo layer, the etching is performed by wet etching using etchant including $H_3PO4$, $CH_3COOH$, $HNO_3$ and $H_2O$. In case of using the MoW layer, the etching is performed by dry etching using $SF_6$, $CF_4$ and/or $O_2$. The doped amorphous silicon layer 106 is then etched using the source/drain 19a and 19b as a mask to form an ohmic layer 47 and a channel layer 48, thereby defining a thin film transistor region.

Figure 8A:
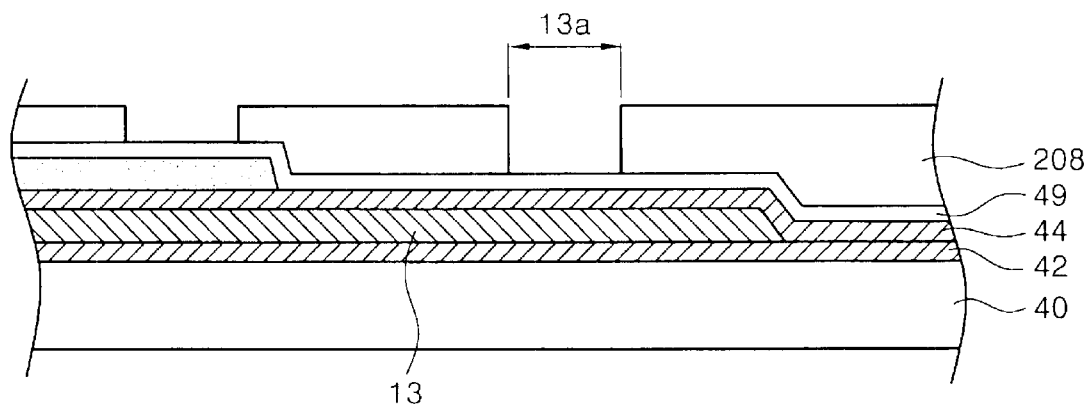
Figure 8B:
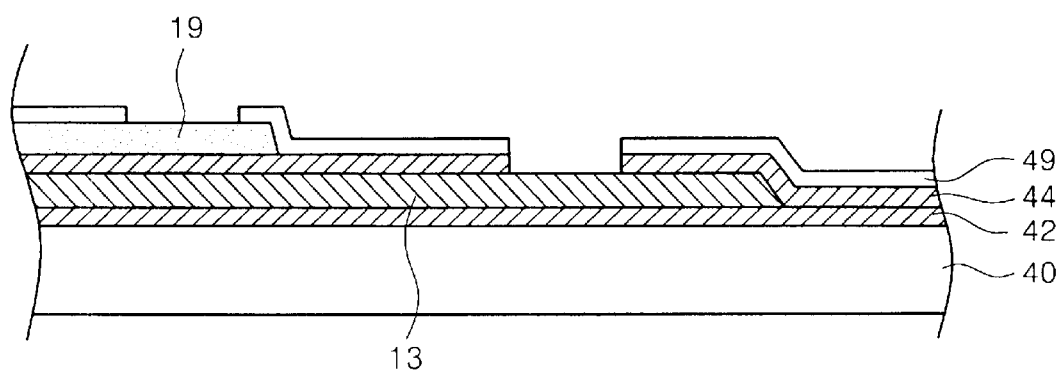
Figure 8C:
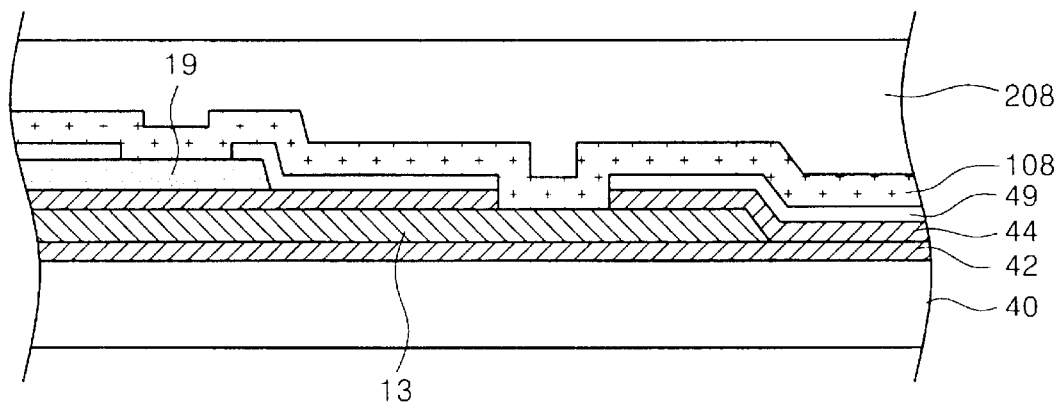

As shown in FIG. 8A and FIG. 8B, the data bus line 19 is formed so as to overlap with a portion of a pad portion 13a of the gate bus line 13, preferably half thereof. Here, the pad portion 13a of the gate bus line 13 and the data bus line 19 are insulated by the insulating layer 44.

Thereafter, a passivation layer 49 is formed on the substrate the ohmic layer 47 and the channel layer 48.

Preferably, the passivation layer 49 is formed of a silicon nitride layer using PECVD. For forming contact between pad portions and outer terminals when performing OLB (out lead bonding), the passivation layer 49 is then etched by etching using a fifth mask 208 to open the pad portion 13a of the gate bus line 13, a portion of the data bus line 46 and the source 19a. And then the fifth mask is removed.

Preferably, the etching is performed using $SF_6$ and/or $O_2$.

Figure 8D:
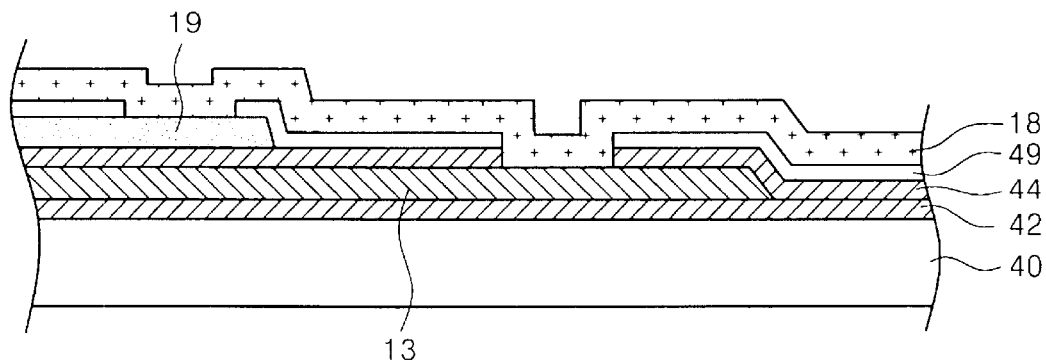

Referring to FIG. 5E to 5F, FIG. 6C and FIG. 8C, a second ITO layer 108 is formed on the substrate opened pad portion 13a Of the gate bus line 13 and the portion of the data bus line 19 and the source 19a, and the second ITO layer 108 etched by etching using a sixth mask 208, as shown in FIGS. 5G, 6D and 8D, thereby forming a pixel electrode 18. Here, the pixel electrode 18 is in contact with the opened source 19a, the data bus line 19 and the pad portion 13a of the gate bus line 13, as shown in FIG. 5G and FIG. 8D. And then the fifth mask is removed.

Preferably, the etching is performed by wet etching using chemical including HCl, $HNO_3$ and $H_2O$.

According to the present invention, a data bus line, a source and a pad portion of a gate bus line are opened simultaneously after forming a passivation layer. A pixel electrode is then formed. Furthermore, an ohmic layer and a channel layer are formed by etching using source/drain as a mask. Therefore, mask number is reduced compared with the prior art, thereby simplifying process. As a result, cost is decreases and yield is improved.

Although the preferred embodiment of this invention has been disclosed for illustrative purpose, those skilled in the art will appreciate that various modifications, additions and substitutions are possible, without departing from the scope and spirit of the invention as described in the accompanying claims.

What is claimed is:

1. A method of manufacturing a liquid crystal display device driving with fringe field between counter and pixel electrodes, comprising the steps of:

depositing a first transparent conductive layer on a transparent insulating substrate and etching the first transparent conductive layer using a first mask, thereby forming a counter electrode;

forming a first insulating layer as a protection layer on the substrate formed the counter electrode;

depositing a first metal layer on the first insulating layer and etching the first metal layer using a second mask, thereby forming a gate bus line and a common electrode line, the common electrode line being in contact with the counter electrode;

forming a gate insulating layer, an amorphous silicon layer and a second insulating layer on the substrate formed on the gate bus line and the common electrode line;

etching the second insulating layer using a third mask to form an etch stopper;

forming a doped amorphous silicon layer and a second metal layer on the substrate formed on the etch stopper;

etching the second metal layer using a fourth mask to form source/drain and a data bus line;

etching the doped amorphous silicon layer and the amorphous silicon layer using the source/drain as a mask to form an ohmic layer and a channel layer;

forming a passivation layer on the substrate formed on the ohmic layer and the channel layer;

etching the passivation layer using a fifth mask to open a pad portion of the gate bus line, a portion of the data bus line and the source; and depositing a second transparent conductive layer on the passivation and etching the second transparent conductive layer using a sixth mask, thereby forming a pixel electrode, the pixel electrode being in contact with the opened source, the data bus line, and the pad portion of the gate bus line.

2. The method according to claim 1, wherein the first transparent conductive layer and second transparent conductive layer are formed of an ITO layer, respectively.

3. The method according to claim 2, wherein in the steps of forming the counter and the pixel electrodes, the etchings are performed by wet etching using chemical including HCl, $HNO_3$ and $H_2O$, respectively.

4. The method according to claim 1, wherein the first insulating layer is formed of a silicon nitride layer.

5. The method according to claim 4, wherein the silicon nitride layer is formed by APCVD using $SiH_4$, $O_2$ and $N_2$ gases.

6. The method according to claim 1, wherein the first metal layer is formed of a MoW layer.

7. The method according to claim 6, wherein the etching of the first metal layer is performed by dry etching using $SF_6$, $CF_4$ and/or $O_2$.

8. The method according to claim 1, wherein the first metal layer is formed of an Al-Nd alloy layer or a Mo/Al layer.

9. The method according to claim 8, wherein the etching of the first metal layer is performed by wet etching using etchant including $H_3PO_4$, $CH_3COOH$, $HNO_3$ and $H_2O$.

10. The method according to claim 1, wherein the second insulating layer is formed of a silicon nitride layer.

11. The method according to claim 10, wherein in the step of forming the etch stopper, the etching is performed using etchant including HF solution of 0.6% and deionized solution.

12. The method according to claim 1, wherein the second metal layer is formed of a Mo/Al/Mo layer or a MoW layer.

13. The method according to claim 12, wherein the etching of the second metal layer is performed by wet etching using etching including $H_3PO_4$, $CH_3COOH$, $HNO_3$ and $H_2O$.

14. The method according to claim 1, wherein the second metal layer is formed of a MoW layer.

15. The method according to claim 14, wherein the etching of the second metal layer is performed by dry etching using $SF_6$, $CF_4$ and/or $O_2$.

16. The method according to claim 15, wherein the etching of the passivation is performed using $SF_6$ and/or $O_2$.

17. The method according to claim 1, wherein the data bus line is formed so as to overlap with ½ of a pad portion of the gate bus line.

18. The method according to claim 1, wherein the passivation layer is formed of a silicon nitride layer.

* * * * *